(12) United States Patent
Framroze

(10) Patent No.: US 8,673,055 B2
(45) Date of Patent: Mar. 18, 2014

(54) IMPROVING THE RECOVERY OF PRECIOUS METALS FROM RECALCITRANT REFRACTORY ORE

(76) Inventor: Bomi P Framroze, Bombay (IN)

( * ) Notice: Subject to any disclaimer, the term of this patent is extended or adjusted under 35 U.S.C. 154(b) by 27 days.

(21) Appl. No.: 13/201,872

(22) PCT Filed: Mar. 4, 2010

(86) PCT No.: PCT/US2010/026160
§ 371 (c)(1),
(2), (4) Date: Aug. 17, 2011

(87) PCT Pub. No.: WO2010/107585
PCT Pub. Date: Sep. 23, 2010

(65) Prior Publication Data
US 2011/0314967 A1 Dec. 29, 2011

Related U.S. Application Data

(60) Provisional application No. 61/210,474, filed on Mar. 20, 2009.

(51) Int. Cl.
| | | |
|---|---|---|
| *C22B 11/00* | (2006.01) | |
| *C22B 1/00* | (2006.01) | |
| *C22B 11/08* | (2006.01) | |
| *C22B 3/10* | (2006.01) | |
| *C22B 3/00* | (2006.01) | |

(52) U.S. Cl.
CPC . *C22B 1/00* (2013.01); *C22B 11/08* (2013.01); *C22B 3/10* (2013.01); *C22B 11/04* (2013.01)
USPC .............................. 75/744; 75/743

(58) Field of Classification Search
CPC ............ C22B 11/08; C22B 1/00; C22B 3/10; C22B 3/16

USPC ............................................................ 75/711
See application file for complete search history.

(56) References Cited

U.S. PATENT DOCUMENTS

| | | | | |
|---|---|---|---|---|
| 3,958,985 | A | * | 5/1976 | Anderson ........................ 75/426 |
| 4,578,163 | A | * | 3/1986 | Kunter et al. ................. 205/569 |
| 5,389,124 | A | | 2/1995 | Nakao |
| 6,843,970 | B1 | * | 1/2005 | Hard ................................ 423/68 |
| 7,732,494 | B2 | | 6/2010 | Yokoyama et al. |
| 7,784,502 | B2 | | 8/2010 | Gershtein et al. |
| 2009/0242840 | A1 | | 10/2009 | Olschimke et al. |

OTHER PUBLICATIONS

Whitehead et al. Application of 1-alkyl-3-methyl-imidazolium ionic liquids in the oxidative leaching of sulphidic copper, gold and silver ores, Hydrometallurgy, 2007, vol. 88, p. 109-120.*

Rika Hagiwara, Acidic 1-ethyl-3-methylimidazolium fluoride: a new room temperature ionic liquid, Journal of Fluorine Chemistry, (1999), pp. 1-3, 99(1).

George Olah, et al, Ionic Liquid and Solid HF Equivalent amine-poly(HF) complexes effecting environmentally friendly isobutane-isobutylene alkylation, Journal of the American Chemical Society, (2005), pp. 5964-5969, 127 (16), American Chemical Society.

* cited by examiner

*Primary Examiner* — Roy King
*Assistant Examiner* — Xiaowei Su
(74) *Attorney, Agent, or Firm* — David M. Gange

(57) ABSTRACT

The invention provides a novel process for improving the recovery of precious metals from recalcitrant refractory ores by the use of hydrofluoric acid dissolved in ionic liquids. The solution of hydrogen fluoride gas in an ionic liquid is contacted with dry crushed ore at a temperature and for a period of time commensurate with the fracturing of a specific recalcitrant refractory ore. The excess ionic liquid is separated from the ore and the fractured ore is further treated with dilute sodium cyanide solution to extract precious metals in greater yields.

7 Claims, No Drawings

IMPROVING THE RECOVERY OF PRECIOUS METALS FROM RECALCITRANT REFRACTORY ORE

CROSS REFERENCE TO RELATED APPLICATIONS

This application claims the benefit of U.S. Provisional Application for Patent No. 61/210,474 filed on Mar. 20, 2009.

FIELD

Embodiments of the invention relate to processes for improving the recovery of precious metals from recalcitrant refractory ores by use of hydrofluoric acid dissolved in ionic liquids.

BACKGROUND

Embodiments of the invention relate to processes for improving the recovery of precious metals specifically gold and silver from recalcitrant refractory ores by use of hydrofluoric acid dissolved in ionic liquids.

WO 84/04759 discloses a method to extract metals from ores which exist in the form of oxides or sulphides, by treating the ore with hydrogen fluoride and/or fluorosilicic acid. When hydrogen fluoride is used, the ore is initially crushed, dried and then contacted with hydrogen fluoride gas at temperatures above 105 C to produce metal fluorides. The metal fluorides are then contacted with aqueous hydrogen fluoride solution and the resulting insoluble metal fluorides and iron oxides are separated from the solution, and metal fluorides preferably including nickel and cobalt fluorides are recovered.

U.S. Pat. No. 4,923,507 discloses a process for opening ores, particularly ores containing tantalum, niobium, zirconium and titanium, wherein the ore normally undergoes stages of leaching with mineral acids, solvent extraction, purification and separation to the metals. Instead of directly leaching with sulfuric acid and hydrofluoric acid as a first stage, the reference describes generating the hydrogen fluoride in-situ by melting the ore together with fluorite ($CaF_2$), followed by milling of the melting product obtained and subsequently leaching with concentrated sulfuric acid only.

More recently Lawrance et al have described in the journal Green Earth. Vol 6, page 313-315, 2004 a process to use ionic liquid to recover gold and silver by making use of iron sulfate as an oxidant and thiourea as a leaching agent. The gold and silver extracted is recovered from the ionic liquid using activated charcoal.

SUMMARY

Embodiments of the invention provide novel processes for improving the recovery of precious metals from recalcitrant refractory ores by use of hydrofluoric acid dissolved in ionic liquids comprising:

(a) preparing a solution of hydrogen fluoride gas (HF) in an ionic liquid (b) contacting the said ionic liquid solution with the dry crushed ore at a temperature and for a period of time commensurate with the fracturing of a specific recalcitrant refractory ore (c) removing the excess ionic liquid from the ore by settling and decantation or filtration and which is further recycled for fracturing of fresh ore (d) treating the fractured ore with dilute sodium cyanide solution to extract and recover precious metals, especially gold and silver Embodiments of the invention relate more particularly to step (a) wherein a solution of HF is prepared in the ionic liquid, 1-butyl-3-methyl-imidazolium hydrogen sulfate (bmim+HSO4−) such that the concentration by weight of HF is between 10%-20% and to step (b) wherein the HF in bmim+HSO4− ionic liquid maybe be diluted with water to form between a 10%-90% aqueous solution which may then be used to fracture recalcitrant refractory ore.

The process described herein is a novel method to improve the recovery of gold and silver metals from recalcitrant refractory ores as exemplified by Perseverance, Kolar, Mount Morgan and Baberton ores, by fracturing the quartz silaceous micro structures which encapsulate the silver and gold salts preventing them from being extracted using standard sodium cyanide solutions as compared to the procedures described in the prior art. More specifically the process of the invention, compared to the procedures known in the art does not require grinding to uneconomical micron size particles, does not involve expensive pre-sorting of the ore by magnetic or gravity separation, does not involve the high energy cost of fracturing the quartz with heat and pressure and can be economically used on a large scale for the commercial extraction of gold and silver metals by incorporation into current heap

DETAILED DESCRIPTION

In the first step of the claimed process, 1-butyl-3-methyl-imidazolium hydrogen sulfate ionic liquid (bmim+HSO4−) is held at 40 C in a stainless steel reactor and into this stirred solution is bubbled in anhydrous hydrogen fluoride gas (HF) at such a rate as to maximize absorption into the solution and minimize venting of the free gas. The reactor is equipped with a basic scrubber to absorb any gas released. The final solution contains between 10%-20% by weight of HF and more preferably 12%-16% by weight of HF.

The above prepared solution of HF in bmim+HSO4− is stable at temperatures between 10 C-50 C and volatilizes less than 1% of HF after 1 month of stirring gently at 30 C in an open container.

The ionic liquid bmim+HSO4− may be substituted by other ionic liquids that may be liquid at room temperature, have low volatility, have good solubilizing characteristics for hydrogen halide gases and are stable for recycle. For example 1-Butyl-3-methylimidazolium (bmim) hexafluorophosphate, 1-Ethyl-3-methylimidazolium (emim) hexafluorophosphate, 4-Methyl-N-butylpyridinium tetrafluoroborate, [bmim] bis(trifluoromethylsulfonyl)imide, [emim] ethylsulfate, 1-Butyl-3-methylimidazolium chloride, 1-Ethyl-3-methylimidazolium nitrite, 1-Ethyl-3-methylimidazolium tris(trifluoromethylsulfonyl)methide, N-Methyl-N-n-propylpyrrolidinium bis(trifluoromethylsulfonyl)imide, 1-Ethyl-3-methylimidazolium tetrabromoaluminate(III), 1-Butyl-3-methylimidazolium tetrachloroferrate, 1-Hexyloxymethyl-3-methylimidazolium tetrafluoroborate may be substituted for bmim+HSO4− in the claimed process with comparable results.

In the second step of the claimed process, the solution of HF in bmim+HSO4− is added to dry crushed ore in a 1:1 to 1:10 wt/wt ratio of ore to ionic liquid solution, more preferably a 1:4 wt/wt ratio of ore to ionic liquid and the suspension is allowed to stand for 4 to 24 hours with occasional shaking of the mass. After the desired contact time is reached which is dependent on the type of ore being fragmented as well as the initial size of the granules, the mass is added onto a mesh filter with an appropriately sized mesh to allow the ionic liquid to drain out from the ore by gravity. The ionic liquid thus separated can be used as is for fragmentation of a new batch of ore.

In the third step of the claimed process the fragmented ore is treated with dilute aqueous solution of sodium cyanide in a typical heap leaching process as practiced in the art, to recover a significantly greater percentage of gold and silver as compared to untreated, un-fragmented ore.

EXPERIMENTAL RESULTS

Example 1

100 ml of 1-butyl-3-methyl-imidazolium hydrogen sulfate bmim+HSO4− is added to a 500 ml stainless steel reactor containing a screw-top and dip-pipe. Technical grade hydrogen fluoride gas is bubbled into the liquid via the dip-pipe from a cylinder at 1 cc/min. After 15 minutes the gas is shut off and to the resultant solution is added 25 grams of Perseverance Ore (Peak Gold Mine, Australia) 80% minus 10 mm. The screw cap is put on and the reactor is set-up on a shaker table for 24 hours.

After 24 hours shaking at 25 C the reactor is opened and the liquid is allowed to drain off the ore by gravity over a mesh filter. 78 ml of the ionic liquid is collected.

The wet ore is the added back into the reactor and 100 ml of 0.1% aqueous solution of sodium cyanide is added to the wet ore. The reactor is sealed and placed on the shaker table for 48 hours after which the pregnant solution containing the solubilized gold and silver is separated by mesh filtration. The gold and silver content of the pregnant solution is measured by modified ICP-AES methodology and compared to the gold and silver content of pregnant solution after treating the same ore with bmim+HSO4− without any dissolved HF (as a control) followed by the same leaching with 0.1% aqueous solution of sodium cyanide.

| Treated With | % gold extracted | % silver extracted |
|---|---|---|
| bmim + HSO4− | 74 | 11 |
| bmim + HSO4− + HF | 79 | 58 |

Example 2

100 ml of 1-butyl-3-methyl-imidazolium hydrogen sulfate bmim+HSO4− is added to a 500 ml stainless steel reactor containing a screw-top and dip-pipe. Technical grade hydrogen fluoride gas is bubbled into the liquid via the dip-pipe from a cylinder at 1 cc/min. After 15 minutes the gas is shut off and to the resultant solution is added 25 grams of Kolar Ore (Kolar Mines, India) 80% minus 25 mm. The screw cap is put on and the reactor is set-up on a shaker table for 24 hours.

After 24 hours shaking at 25 C the reactor is opened and the liquid is allowed to drain off the ore by gravity over a mesh filter. 88 ml of the ionic liquid is collected.

The wet ore is the added back into the reactor and 100 ml of 0.1% aqueous solution of sodium cyanide is added to the wet ore. The reactor is sealed and placed on the shaker table for 48 hours after which the pregnant solution containing the solubilized gold and silver is separated by mesh filtration. The gold and silver content of the pregnant solution is measured by modified ICP-AES methodology and compared to the gold and silver content of pregnant solution after treating the same ore with bmim+HSO4− without any dissolved HF (as a control) followed by the same leaching with 0.1% aqueous solution of sodium cyanide.

| Treated With | % gold extracted | % silver extracted |
|---|---|---|
| bmim + HSO4− | 73 | 67 |
| bmim + HSO4− + HF | 75 | 84 |

Example 3

100 ml of 1-butyl-3-methyl-imidazolium hydrogen sulfate bmim+HSO4− is added to a 500 ml stainless steel reactor containing a screw-top and dip-pipe. Technical grade hydrogen fluoride gas is bubbled into the liquid via the dip-pipe from a cylinder at 1 cc/min. After 15 minutes the gas is shut off and to the resultant solution is added 25 grams of Mount Morgan Ore, Australia 80% minus 24 mm. The screw cap is put on and the reactor is set-up on a shaker table for 24 hours.

After 24 hours shaking at 25 C the reactor is opened and the liquid is allowed to drain off the ore by gravity over a mesh filter. 78 ml of the ionic liquid is collected.

The wet ore is the added back into the reactor and 100 ml of 0.1% aqueous solution of sodium cyanide is added to the wet ore. The reactor is sealed and placed on the shaker table for 48 hours after which the pregnant solution containing the solubilized gold and silver is separated by mesh filtration. The gold and silver content of the pregnant solution is measured by modified ICP-AES methodology and compared to the gold and silver content of pregnant solution after treating the same ore with bmim+HSO4− without any dissolved HF (as a control) followed by the same leaching with 0.1% aqueous solution of sodium cyanide.

| Treated With | % gold extracted | % silver extracted |
|---|---|---|
| bmim + HSO4− | 62 | 74 |
| bmim + HSO4− + HF | 70 | 83 |

Example 4

100 ml of 1-butyl-3-methyl-imidazolium hydrogen sulfate bmim+HSO4− is added to a 500 ml stainless steel reactor containing a screw-top and dip-pipe. Technical grade hydrogen fluoride gas is bubbled into the liquid via the dip-pipe from a cylinder at 1 cc/min. After 15 minutes the gas is shut off and to the resultant solution is added 25 grams of Barberton Ore South Africa 80% minus 15 mm. The screw cap is put on and the reactor is set-up on a shaker table for 24 hours.

After 24 hours shaking at 25 C the reactor is opened and the liquid is allowed to drain off the ore by gravity over a mesh filter. 78 ml of the ionic liquid is collected.

The wet ore is the added back into the reactor and 100 ml of 0.1% aqueous solution of sodium cyanide is added to the wet ore. The reactor is sealed and placed on the shaker table for 48 hours after which the pregnant solution containing the solubilized gold and silver is separated by mesh filtration. The gold and silver content of the pregnant solution is measured by modified ICP-AES methodology and compared to the gold and silver content of pregnant solution after treating the same ore with bmim+HSO4− without any dissolved HF (as a control) followed by the same leaching with 0.1% aqueous solution of sodium cyanide.

| Treated With | % gold extracted | % silver extracted |
|---|---|---|
| bmim + HSO4− | 69 | 89 |
| bmim + HSO4− + HF | 77 | 87 |

Example 5

100 ml of 1-butyl-3-methyl-imidazolium hydrogen sulfate bmim+HSO4− is added to a 500 ml stainless steel reactor containing a screw-top and dip-pipe. Technical grade hydrogen fluoride gas is bubbled into the liquid via the dip-pipe from a cylinder at 1 cc/min. After 15 minutes the gas is shut off and to the resultant solution is added 25 grams of Kolar Ore (Kolar Mines, India) 80% minus 25 mm. The screw cap is put on and the reactor is set-up on a shaker table for 24 hours.

After 24 hours shaking at 25 C the reactor is opened and the liquid is allowed to drain off the ore by gravity over a mesh filter. 88 ml of the ionic liquid is collected.

The wet ore is the added back into the reactor and 100 ml of 0.1% aqueous solution of sodium cyanide is added to the wet ore. The reactor is sealed and placed on the shaker table for 48 hours after which the pregnant solution containing the solubilized gold and silver is separated by mesh filtration. The gold and silver content of the pregnant solution is measured by modified ICP-AES methodology.

The 88 ml of HF containing bmim+HSO4− is recycled after making up the volume to 100 ml with fresh bmim+HSO4− and the above process is repeated 10 times. The table below shows the total recyclability of the HF containing ionic liquid in the extraction process.

| Nos of recycles | % silver extracted |
|---|---|
| 1 | 85 |
| 2 | 84 |
| 3 | 84 |
| 4 | 84 |
| 5 | 85 |
| 6 | 83 |
| 7 | 84 |
| 8 | 85 |
| 9 | 84 |
| 10 | 84 |

Example 6

100 ml of 1-butyl-3-methyl-imidazolium hydrogen sulfate bmim+BF4− is added to a 500 ml stainless steel reactor containing a screw-top and dip-pipe. Technical grade hydrogen fluoride gas is bubbled into the liquid via the dip-pipe from a cylinder at 1 cc/min. After 15 minutes the gas is shut off and to the resultant solution is added 25 grams of Kolar Ore (Kolar Mines, India) 80% minus 25 mm. The screw cap is put on and the reactor is set-up on a shaker table for 24 hours.

After 24 hours shaking at 25 C the reactor is opened and the liquid is allowed to drain off the ore by gravity over a mesh filter. 88 ml of the ionic liquid is collected.

The wet ore is the added back into the reactor and 100 ml of 0.1% aqueous solution of sodium cyanide is added to the wet ore. The reactor is sealed and placed on the shaker table for 48 hours after which the pregnant solution containing the solubilized gold and silver is separated by mesh filtration. The gold and silver content of the pregnant solution is measured by modified ICP-AES methodology and compared to the gold and silver content of pregnant solution after treating the same ore with bmim+BF4− without any dissolved HF (as a control) followed by the same leaching with 0.1% aqueous solution of sodium cyanide.

| Treated With | % gold extracted | % silver extracted |
|---|---|---|
| bmim + BF4− | 71 | 67 |
| bmim + BF4− + HF | 70 | 76 |

Example 7

100 ml of 1-butyl-3-methyl-imidazolium hydrogen sulfate bmim+HSO4− is added to a 500 ml stainless steel reactor containing a screw-top and dip-pipe. Technical grade hydrogen fluoride gas is bubbled into the liquid via the dip-pipe from a cylinder at 1 cc/min. After 15 minutes the gas is shut off and to the resultant solution is added 25 grams of Kolar Ore (Kolar Mines, India) 80% minus 25 mm. The screw cap is put on and the reactor is set-up on a shaker table for 24 hours.

After 24 hours shaking at 25 C the reactor is opened and the liquid is allowed to drain off the ore by gravity over a mesh filter. 88 ml of the ionic liquid is collected.

The wet ore is replaced in the reactor together with 90 ml of water and shaken for 15 minutes. The ore is once again filtered on a mesh and the 10% w/w aqueous solution of ionic liquid (10% IL) is collected.

100 ml of the 10% IL solution from above is added to a 500 ml stainless steel reactor containing a screw-top and dip-pipe. To this solution is added 25 grams of Kolar Ore (Kolar Mines, India) 80% minus 25 mm and 100 ml of 0.1% aqueous solution of sodium cyanide. The screw cap is put on and the reactor is set-up on a shaker table for 48 hours.

After 48 hours shaking at 25 C the reactor is opened and the liquid is allowed to drain off the ore by gravity over a mesh filter. The gold and silver content of the pregnant solution is measured by modified ICP-AES methodology and compared to the gold and silver content of pregnant solution after treating the same ore only with 0.1% sodium cyanide solution.

| Treated With | % gold extracted | % silver extracted |
|---|---|---|
| 0.1% NaCN aq. solution | 70 | 62 |
| 10% IL + 0.1% NaCN aq. solution | 74 | 71 |

I claim:

1. A process for improving the recovery of precious metals from recalcitrant refractory ores comprising:
   (a) preparing a solution of hydrogen fluoride gas (HF) in an ionic liquid;
   (b) contacting said HF containing ionic liquid with crushed ore at a temperature and for a period of time commensurate with the fracturing of the recalcitrant refractory ore;
   (c) removing the excess HF containing ionic liquid from the ore by settling and decantation or filtration;
   (d) recycling the HF containing ionic liquid for treatment and fracturing of fresh ore;

(e1) treating the fractured ore with dilute sodium cyanide solution to extract the precious metals into solution, wherein the ionic liquid is selected from 1-butyl-3-methyl-imidazolium hydrogen sulfate, 1-Butyl-3-methylimidazolium (bmim) hexafluorophosphate, 1-Ethyl-3-methylimidazolium (emim) hexafluorophosphate, 4-Methyl-N-butylpyridinium tetrafluoroborate, [bmim] bis(trifluoromethylsulfonyl)imide, [emim]ethylsulfate, 1-Butyl-3-methylimidazolium chloride, 1-Ethyl-3-methylimidazolium nitrite, 1-Ethyl-3-methylimidazolium tris(trifluoromethylsulfonyl)methide, N-Methyl-N-n-propylpyrrolidinium bis(trifluoromethylsulfonyl)imide, 1-Ethyl-3-methylimidazolium tetrabromoaluminate (III), 1-Butyl-3-methylimidazolium tetrachloroferrate, or 1-Hexyloxymethyl-3-methylimidazolium tetrafluoroborate; and the concentration of the hydrogen fluoride dissolved in the ionic liquid is between 10% and 20% weight by weight of ionic liquid.

2. The process of claim 1 wherein the precious metals are gold and silver.

3. The process of claim 1 wherein the temperature for contact between the HF containing ionic liquid and the crushed ore is between 20° C. and 45° C. and the period of time is between 4 hours and 7 days.

4. A process for improving the recovery of precious metals from recalcitrant refractory ores by contacting said ore with a 10% to 90% aqueous solution of 1-butyl-3-methyl-imidazolium hydrogen sulfate containing between 12% to 16% weight of hydrogen fluoride gas by weight of 1-butyl-3-methyl-imidazolium hydrogen sulfate so as to fracturing the ore and extract a higher percentage of precious metals from said ore.

5. A process for improving the recovery of precious metals from recalcitrant refractory ores consisting essentially of:

(a) preparing a solution of hydrogen fluoride gas (HF) in an ionic liquid;

(b) contacting said HF containing ionic liquid with crushed ore at a temperature and for a period of time commensurate with the fracturing of the recalcitrant refractory ore;

(c) removing the excess HF containing ionic liquid from the ore by settling and decantation or filtration;

(d) recycling the HF containing ionic liquid for treatment and fracturing of fresh ore;

(e1) treating the fractured ore with dilute sodium cyanide solution to extract the precious metals into solution, wherein the ionic liquid is selected from 1-butyl-3-methyl-imidazolium hydrogen sulfate, 1-Butyl-3-methylimidazolium (bmim) hexafluorophosphate, 1-Ethyl-3-methylimidazolium (emim) hexafluorophosphate, 4-Methyl-N-butylpyridinium tetrafluoroborate, [bmim] bis(trifluoromethylsulfonyl)imide, [emim] ethylsulfate, 1-Butyl-3-methylimidazolium chloride, 1-Ethyl-3-methylimidazolium nitrite, 1-Ethyl-3-methylimidazolium tris(trifluoromethylsulfonyl)methide, N-Methyl-N-n-propylpyrrolidinium bis(trifluoromethylsulfonyl)imide, 1-Ethyl-3-methylimidazolium tetrabromoaluminate (III), 1-Butyl-3-methylimidazolium tetrachloroferrate, or 1-Hexyloxymethyl-3-methylimidazolium tetrafluoroborate; and the concentration of the hydrogen fluoride dissolved in the ionic liquid is between 10% and 20% weight by weight of ionic liquid.

6. The process of claim 5, wherein the precious metals are gold and silver.

7. The process of claim 5, wherein the temperature for contact between the HF containing ionic liquid and the crushed ore is between 20° C. and 60° C. and the period of time is between 4 hours and 7 days.

\* \* \* \* \*